(12) United States Patent
Do et al.

(10) Patent No.: US 9,026,138 B2
(45) Date of Patent: May 5, 2015

(54) METHOD AND/OR SYSTEM FOR OBTAINING SIGNATURES FOR USE IN NAVIGATION

(71) Applicant: QUALCOMM Incorporated, San Diego, CA (US)

(72) Inventors: Ju-Yong Do, Palo Alto, CA (US); Saumitra Mohan Das, Santa Clara, CA (US); Faraz Mohammad Mirzaei, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 13/738,912

(22) Filed: Jan. 10, 2013

(65) Prior Publication Data

US 2014/0194137 A1     Jul. 10, 2014

(51) Int. Cl.
*H04W 24/00*     (2009.01)
(52) U.S. Cl.
CPC ..................................... *H04W 24/00* (2013.01)
(58) Field of Classification Search
CPC ....... H04W 64/00; H04W 24/02; H04W 4/02; H04W 4/023; H04L 29/08657
USPC ............ 455/410, 456.1–456.2; 370/252, 328; 703/2
See application file for complete search history.

(56) References Cited

U.S. PATENT DOCUMENTS

| | | | | |
|---|---|---|---|---|
| 6,486,831 | B1* | 11/2002 | Martorana et al. | 342/458 |
| 2005/0124354 | A1* | 6/2005 | Durgin | 455/456.1 |
| 2006/0128370 | A1* | 6/2006 | Tahara | 455/420 |
| 2008/0231511 | A1* | 9/2008 | Montuno et al. | 342/387 |
| 2008/0280624 | A1* | 11/2008 | Wrappe | 455/456.1 |
| 2009/0286510 | A1* | 11/2009 | Huber et al. | 455/410 |
| 2010/0135178 | A1* | 6/2010 | Aggarwal et al. | 370/252 |
| 2010/0190509 | A1* | 7/2010 | Davis | 455/456.1 |
| 2011/0039580 | A1* | 2/2011 | Wigren et al. | 455/456.1 |
| 2011/0095946 | A1 | 4/2011 | Castillo | |
| 2011/0165892 | A1* | 7/2011 | Ristich et al. | 455/456.2 |
| 2011/0246148 | A1* | 10/2011 | Gupta et al. | 703/2 |
| 2012/0028654 | A1 | 2/2012 | Gupta et al. | |
| 2012/0052875 | A1 | 3/2012 | Kangas et al. | |
| 2012/0056786 | A1* | 3/2012 | Pandey et al. | 342/463 |
| 2012/0295654 | A1 | 11/2012 | Sridhara et al. | |
| 2013/0035109 | A1* | 2/2013 | Tsruya et al. | 455/456.1 |

FOREIGN PATENT DOCUMENTS

| | | |
|---|---|---|
| EP | 2141957 A1 | 1/2010 |
| WO | WO-0034799 A1 | 6/2000 |
| WO | WO-2010059934 A2 | 5/2010 |
| WO | WO-2011047310 A1 | 4/2011 |

OTHER PUBLICATIONS

International Search Report—PCT/US2014/010387—ISA/EPO—Apr. 29, 2014.

* cited by examiner

*Primary Examiner* — Nathan Taylor
(74) *Attorney, Agent, or Firm* — Berkeley Law & Technology Group, LLP

(57) ABSTRACT

Disclosed are systems, methods and techniques for obtaining round trip time (RTT) measurements from acquisition of signals at one or more mobile devices, the signals being transmitted by one or more transmitters; approximating locations of the one or more mobile devices while obtaining the RTT measurements; and combining the measurements to determine expected RTT signature values at discrete positions in the area based, at least in part, on the obtained RTT measurements and the approximated locations.

31 Claims, 11 Drawing Sheets

| Field | Size (Bytes) | Description |
| --- | --- | --- |
| A | 2 | Node ID |
| B | 1 for each AP | RSSI Heat Map Values |
| C | 1 for each AP | RSSI Variance (optional) |
| D | 2 for each AP | Delay Heat Map Values |
| E | 2 for each AP | Delay Variance |

METHOD AND/OR SYSTEM FOR OBTAINING SIGNATURES FOR USE IN NAVIGATION

BACKGROUND

1. Field

The subject matter herein relates to techniques for obtaining location-based signatures for use by a mobile device in positioning operations.

2. Information

GPS and other like satellite positioning systems have enabled navigation services for mobile handsets in outdoor environments. Since satellite signals may not be reliably received and/or acquired in an indoor environment, different techniques may be employed to enable navigation services. For example, mobile devices can typically obtain a position fix by measuring ranges to three or more terrestrial wireless access points which are positioned at known locations. Such ranges may be measured, for example, by obtaining a MAC ID address from signals received from such access points and measuring one or more characteristics of signals received from such access points such as, for example, received signal strength indicator (RSSI), round trip delay (RTT), just to name a few examples.

BRIEF DESCRIPTION OF DRAWINGS

Non-limiting and non-exhaustive aspects are described with reference to the following figures, wherein like reference numerals refer to like parts throughout the various figures unless otherwise specified.

SUMMARY

Figure 1:
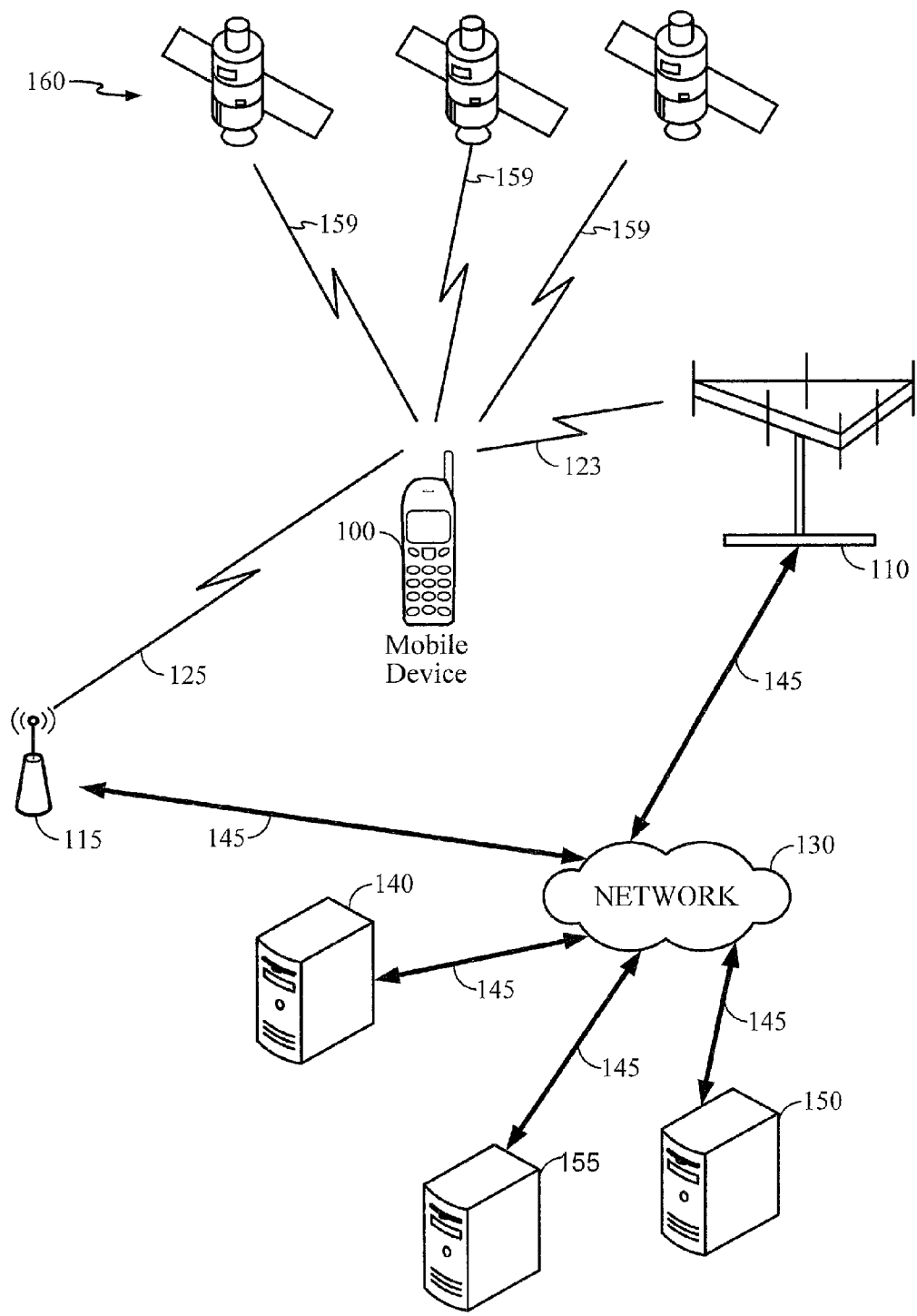
FIG. 1 is a system diagram illustrating certain features of a system containing a mobile device, in accordance with an implementation.

Particular implementations are directed to a method comprising: obtaining round trip time (RTT) measurements from acquisition of signals at one or more mobile devices, said signals being transmitted by one or more transmitters; approximating locations of said one or more mobile devices while obtaining said RTT measurements; and combining said measurements to determine expected RTT signature values at discrete positions in the area based, at least in part, on the obtained RTT measurements and the approximated locations.

Another particular implementation is directed to an apparatus comprising: a communication interface; and one or more processors to: access round trip time (RTT) measurement values received at said communication interface, said RTT measurement values obtained from acquisition of signals at one or more mobile devices, said signals being transmitted by one or more transmitters; approximate locations of said one or more mobile devices while obtaining said RTT measurement values; and combine said measurements to determine expected RTT signature values at discrete positions in the area based, at least in part, on the obtained RTT measurements and the approximated locations.

Another particular implementation is directed to an article comprising: a storage medium comprising machine-readable instructions stored thereon which are executable by a special purpose computing apparatus to: obtain round trip time (RTT) measurements from acquisition of signals at one or more mobile devices, said signals being transmitted by one or more transmitters; approximate locations of said one or more mobile devices while obtaining said RTT measurements; and combine said measurements to determine expected RTT signature values at discrete positions in the area based, at least in part, on the obtained RTT measurements and the approximated locations based, at least in part, on the obtained RTT measurements and the approximated locations.

Another particular implementation is directed to an apparatus comprising: means for obtaining round trip time (RTT) measurements from acquisition of signals at one or more mobile devices, said signals being transmitted by one or more transmitters; means for approximating locations of said one or more mobile devices while obtaining said RTT measurements; and means for combining said measurements to determine expected RTT signature values at discrete positions in the area based, at least in part, on the obtained RTT measurements and the approximated locations.

Another particular implementation is directed to a method comprising, at a mobile device: approximating a location of said mobile device; obtaining one or more round trip time (RTT) measurements from acquisition of one or more signals at said mobile device, said signals being transmitted by one or more transmitters; and transmitting one or more messages comprising said approximate location and said one or more RTT measurements to a server for use in computing expected RTT signature values at discrete positions in an area.

Another particular implementation is directed to a mobile device comprising: a transceiver to transmit and receive signals over a wireless communication link; and one or more processors to: obtain one or more round trip time (RTT) measurements from acquisition of one or more signals at said transceiver, said signals being transmitted by one or more transmitters; and initiate transmission of one or more messages through said transceiver comprising an approximate location of said mobile device and said one or more RTT measurements to a server for use in computing expected RTT signature values at discrete positions in an area.

Another particular implementation is directed to a mobile device comprising: means for approximating a location of said mobile device; means for obtaining one or more round trip time (RTT) measurements from acquisition of one or more signals at said mobile device, said signals being transmitted by one or more transmitters; and means for transmitting one or more messages comprising said approximate location and said one or more RTT measurements to a server for use in computing expected RTT signature values at discrete positions in an area.

Another particular implementation is directed to an article comprising: a storage medium comprising machine-readable instructions stored thereon which are executable by a special purpose computing apparatus in a mobile device to: approximate a location of said mobile device; obtain one or more round trip time (RTT) measurements from acquisition of one or more signals at said mobile device, said signals being transmitted by one or more transmitters; and transmit one or more messages comprising said approximate location and said one or more RTT measurements to a server for use in computing expected RTT signature values at discrete positions in an area.

It should be understood that the aforementioned implementations are merely example implementations, and that claimed subject matter is not necessarily limited to any particular aspect of these example implementations.

DETAILED DESCRIPTION

In some implementations of a mobile positioning system, an indoor navigation system may selectively provide positioning assistance data to mobile stations to facilitate and/or enable location determination services. Such positioning assistance data may include, for example, information to facilitate measurements of ranges to wireless access points at known fixed locations. For example, radio "heatmap" or "fingerprint" data indicating expected RSSI and/or RTT delay times associated with access points may enable a mobile station to associate signal measurements with locations in an indoor area. As such, expected RSSI and/or RTT values maintained in a radio heatmap may comprise signal strength signature values and/or RTT signature values for use by a client mobile station to compare against characteristics of acquired signals.

In a particular implementation, positioning assistance data may be provided to mobile stations from a local or remote server through wireless communication links. Positioning assistance data may be provided as metadata along with metadata included in a digital map. Here, grid points may be laid over locations in an indoor interval at uniform spacing (e.g., two-feet separation of neighboring grid points).

In particular implementations, an expected RTT signature value for a heatmap grid point may be computed off line by, for example, computing a line of sight distance between a transceiver and the grid point. The RTT signature value may then be computed as the sum of the time for a probe signal to travel the computed distance from a mobile device to the transceiver, the time for a response signal to travel the distance from the transceiver to the mobile device and an expected processing latency at the transceiver for acquiring the probe signal and transmitting the response signal. In dense indoor environments, structures such as doors, walls, partitions, furniture, etc. may introduce multipath which may distort an RTT measured at a mobile device from an RTT signature value computed as described above. This distortion in RTT measurements from computed expected RTT signature values may affect the accuracy of position fixes obtained using an RTT radio heatmap.

According to an embodiment, RTT signature values in a heatmap may be computed from measurements obtained by one or more mobile devices and combined at a server. For example, mobile devices in an indoor area may have an ability to approximate its "ground truth" location where an RTT measurement is made in connection with an AP transmitter using any one of several techniques such as, for example, receiving a user input at a user interface, applying trilateration to measurements of ranges to transmitters at fixed locations using RSSI, applying dead-reckoning measurements obtained from inertial sensors (e.g., from a known starting position), just to provide a few examples. In a particular implementation, a mobile device may combine RTT measurements with approximate locations of where the RTT measurements are obtained in messages for transmission to a server. The sever may combine measurements from multiple mobile devices for computing expected RTT signature values for a radio heatmap.

According to an embodiment, a server receiving messages with RTT measurements combined with approximate locations of where the RTT measurements are obtained may compute expected RTT signature values for a heatmap. As pointed out above, a radio heatmap may define discrete positions over a coverage area for which RSSI and/or RTT signature values may be obtained. Using RTT measurements in combination with the approximate locations of where the RTT measurements were obtained, the server may interpolate and/or extrapolate between or among the approximate locations and the discrete positions for determining expected RTT signatures at the discrete positions. Interpolation methods may include nearest neighbor interpolation, bilinear interpolation, bicubic interpolation, sin c filter, and Lanczos resampling, just to mention a few examples. In a particular implementation, the server may apply a Gaussian process regression to perform this interpolation.

In certain implementations, as shown in FIG. 1, a mobile device 100 may receive or acquire Satellite Positioning System (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, WAAS, EGNOS, QZSS, just to name a few examples.

In addition, the mobile device 100 may transmit radio signals to, and receive radio signals from, a wireless communication network. In one example, mobile device may communicate with a cellular communication network by transmitting wireless signals to, or receive wireless signals from, a base station transceiver 110 over a wireless communication link 123. Similarly, mobile device 100 may transmit wireless signals to, or receive wireless signals from a local transceiver 115 over a wireless communication link 125.

In a particular implementation, local transceiver 115 may be configured to communicate with mobile device 100 at a shorter range over wireless communication link 125 than at a range enabled by base station transceiver 110 over wireless communication link 123. For example, local transceiver 115 may be positioned in an indoor environment. Local transceiver 115 may provide access to a wireless local area network (WLAN, e.g., IEEE Std. 802.11 network) or wireless personal area network (WPAN, e.g., Bluetooth network). In another example implementation, local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, base station transceiver 110 and local transceiver 115 may communicate with servers 140, 150 and 155 over a network 130 through links 145. Here, network 130 may comprise any combination of wired or wireless links. In a particular implementation, network 130 may comprise Internet Protocol (IP) infrastructure capable of transmitting pockets between mobile device 100 and servers 140, 150 or 155 through local transceiver 115 or base station transceiver 110. In another implementation, network 130 may comprise cellular communication network infrastructure such as, for example, a base station controller or master switching center to facilitate mobile cellular communication with mobile device 100.

In particular implementations, and as discussed below, mobile device 100 may have circuitry and processing resources capable of computing a position fix or estimated location of mobile device 100. For example, mobile device 100 may compute a position fix based, at least in part, on pseudorange measurements to four or more SPS satellites 160. Here, mobile device 100 may compute such pseudorange measurements based, at least in part, on of pseudonoise code phase detections in signals 159 acquired from four or more SPS satellites 160. In particular implementations, mobile device 100 may receive from server 140, 150 or 155 positioning assistance data to aid in the acquisition of signals 159 transmitted by SPS satellites 160 including, for example, almanac, ephemeris data, Doppler search windows, just to name a few examples.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/ or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices can typically obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio "heatmap" indicating expected RSSI and/or RTT signatures at particular locations in an indoor area.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid a mobile device with indoor positioning operations may include radio heatmaps, locations and identities of transmitters, routeability graphs, just to name a few examples. Other assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In one implementation, a routeability graph and/or digital map may assist mobile device 100 in defining feasible areas for navigation within an indoor area and subject to physical obstructions (e.g., walls) and passage ways (e.g., doorways in walls). Here, by defining feasible areas for navigation, mobile device 100 may apply constraints to aid in the application of filtering measurements for estimating locations and/or motion trajectories according to a motion model (e.g., according to a particle filter and/or Kalman filter). In addition to measurements obtained from the acquisition of signals from local transmitters, according to a particular embodiment, mobile device 100 may further apply a motion model to measurements or inferences obtained from inertial sensors (e.g., accelerometers, gyroscopes, magnetometers, etc.) and/ or environment sensors (e.g., temperature sensors, microphones, barometric pressure sensors, ambient light sensors, camera imager, etc.) in estimating a location or motion state of mobile device 100.

According to an embodiment, mobile device 100 may access indoor navigation assistance data through servers 140, 150 or 155 by, for example, requesting the indoor assistance data through selection of a universal resource locator (URL). In particular implementations, servers 140, 150 or 155 may be capable of providing indoor navigation assistance data to cover many different indoor areas including, for example, floors of buildings, wings of hospitals, terminals at an airport, portions of a university campus, areas of a large shopping mall, just to name a few examples. Also, memory resources at mobile device 100 and data transmission resources may make receipt of indoor navigation assistance data for all areas served by servers 140, 150 or 155 impractical or infeasible, a request for indoor navigation assistance data from mobile device 100 may indicate a rough or course estimate of a location of mobile device 100. Mobile device 100 may then be provided indoor navigation assistance data covering areas including and/or proximate to the rough or course estimate of the location of mobile device 100.

In one particular implementation, a request for indoor navigation assistance data from mobile device 100 may specify a location context identifier (LCI). Such an LCI may be associated with a locally defined area such as, for example, a particular floor of a building or other indoor area which is not mapped according to a global coordinate system. In one example server architecture, upon entry of an area, mobile device 100 may request a first server, such as server 140, to provide one or more LCIs covering the area or adjacent areas. Here, the request from the mobile device 100 may include a rough location of mobile device 100 such that the requested server may associate the rough location with areas covered by known LCIs, and then transmit those LCIs to mobile device 100. Mobile device 100 may then use the received LCIs in subsequent messages with a different server, such as server 150, for obtaining navigation assistance relevant to an area identifiable by one or more of the LCIs as discussed above (e.g., digital maps, locations and identifies of beacon transmitters, radio heatmaps or routeability graphs).

In particular implementations as described herein, a mobile device may extract features from an electronic or digitally encoded map and classify bounded areas depicted in the map. In a particular application, classifications of the bounded areas in the map may then be used by the mobile device to derive a probability heatmap for use by the mobile device in navigation applications to, for example, estimate a position or motion state of the mobile device. In other particular applications, a probability heatmap may be derived from features extracted from an electronic or digitally encoded map by the same or similar operations performed at a server device. Such a probability heatmap derived at a server device may then be transmitted to a mobile device over a communication network as positioning assistance data for use by the mobile device.

Figure 2:
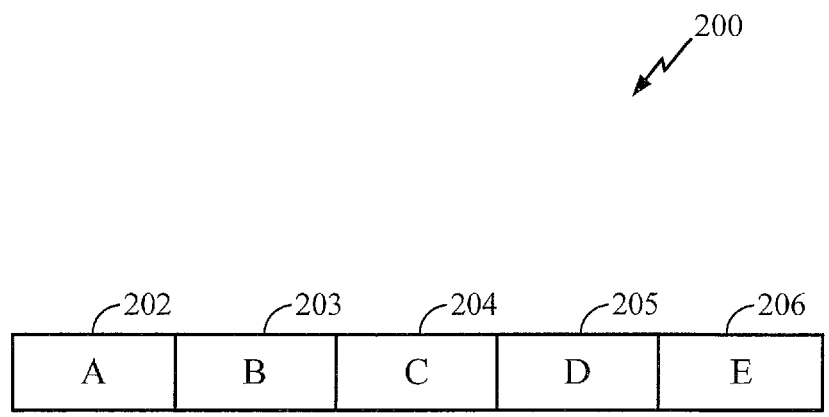
FIG. 2 is a representation of a radio heatmap comprising location-based signatures that may be applied by a mobile device in positioning operations according to an embodiment.

FIG. 2 is a representation of a radio heatmap comprising location-based signatures that may be applied by a mobile device in positioning operations according to an embodiment. Here, a radio heatmap may comprise location-based signature values stored in a particular data structure formed in a non-transitory storage medium (e.g., in a mobile device and/or accessible as navigation assistance data from a remote server). Here, a radio heatmap may store expected signatures of RSSI and/or RTT from particular transmitters (e.g., as identified by MAC addresses) for particular grid point locations in an area of interest. In the particular illustrated embodiment, the radio heatmap of FIG. 2 stores location-based signature values in rows corresponding with grid point locations. For simplicity, the radio heatmap shown in FIG. 2 provides location based-signature values comprising expected signature values of signals acquired from a signal transmitter. It should be understood, however, that in other implementations a radio heatmap may comprise expected signature values of signals acquired from signals of multiple different transmitters positioned at different locations.

A single row 200 may include a node identifier (ID) 202 (e.g., corresponding with a particular location of a grid point in the area of interest), expected RSSI signature values 203 and variances 204, and expected RTT signature values 205 and variances 206. As shown in the particular example above, an expected RSSI signature value 203 and associated variance 204 for a given node ID 202 (e.g., indicative a particular location of a grid point) may be represented by one byte each while an RTT signature value 205 and associated variance 206 for node ID 202 may be represented by two bytes each.

Figure 3:
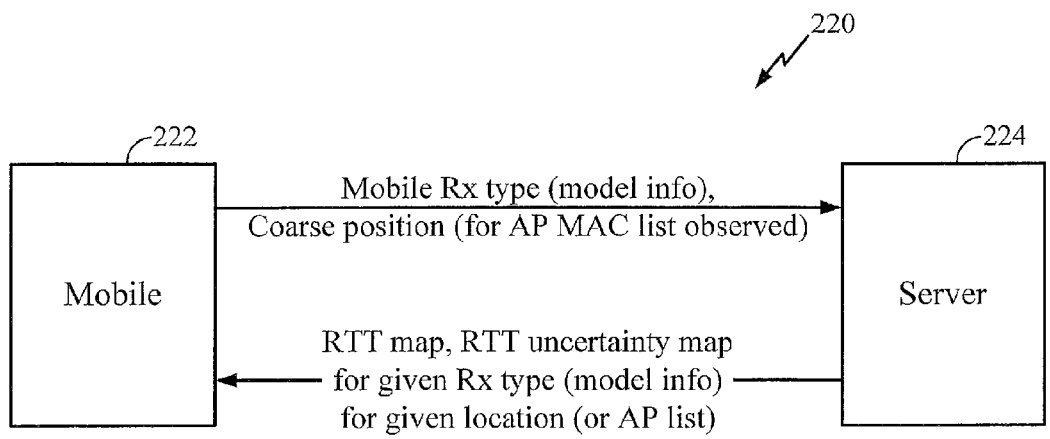
FIG. 3 is a schematic diagram illustrating interactions between a mobile device and a server according to an embodiment.

FIG. 3 is a schematic diagram illustrating interactions between a mobile device and a server according to an embodiment. Here, a mobile device 222 (e.g., mobile device 100) may communicate with a server 224 (e.g., server 140, 150 or 155) over a link (e.g., uplink and/or downlink of a wireless communication link). In this particular implementation, mobile device 222 may transmit a message requesting navigation assistance data including a course position of mobile device 220 or other information indicative of a location of mobile device 22 such as, for example, identities of observed transmitters (e.g., list MAC addresses of observable access points) or an LCI or other context handle. The message requesting navigation assistance data may also identify a particular receiver type that is employed mobile device 222. As discussed below, a radio heatmap may also be tailored to specific receiver types (e.g., as indicated in connection with FIG. 6).

In response to a request message for navigation assistance data from mobile device 222, server 224 may respond with a radio heatmap including expected RTT signature values. Here, server 224 may respond by transmitting all or a portion of location-based signature values to populate a data structure such as that illustrated in FIG. 2. In a particular implementation, the received location-based signature values may be tailored or determined according to a type of receiver indicated in the request message.

Figure 4A:
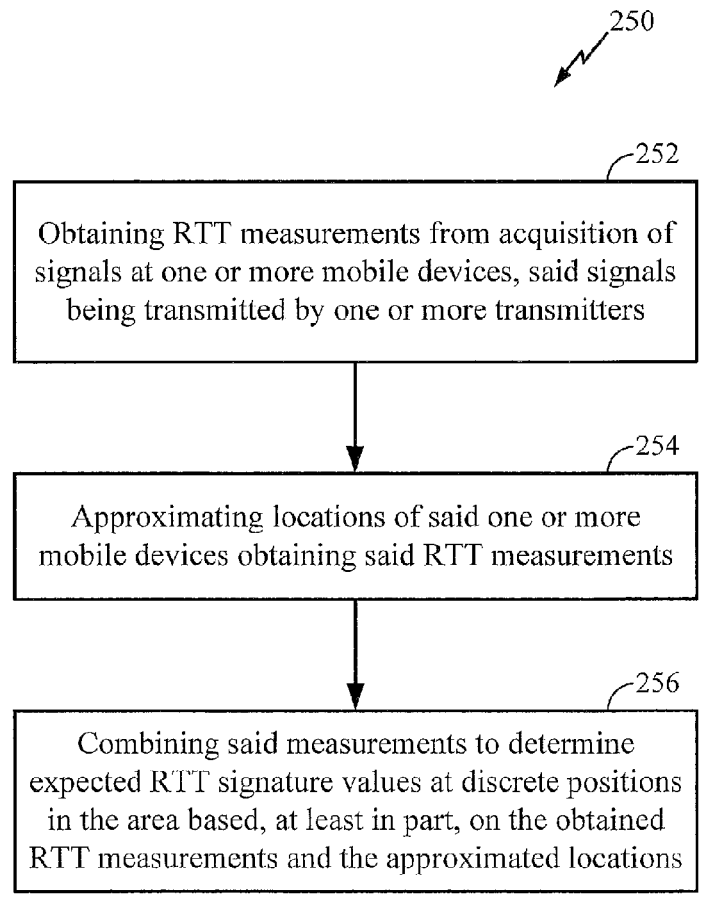
FIG. 4A is a flow diagram of a process to determine location-based signature values according to an embodiment.

FIG. 4A is a flow diagram of a process 250 to determine location-based signature values (e.g., to be provided by a server as navigation assistance data) according to an embodiment. As pointed out above, a particular implementation is directed to updating or improving RTT signature values based, at least in part, on RTT measurements obtained by mobile devices over an area of interest. Process 250 may be performed in whole or in part by a special purpose computing apparatus at a server (e.g., server 140, 150 and 155). Alternatively, process 250 may be performed by a special purpose computing apparatus at a mobile device.

Block 252 may obtain RTT measurements from acquisition of signals at one or more mobile devices transmitted from one or more transmitters over an area while block 254 may approximate locations of the mobile devices at the time the signals are acquired. Locations of the mobile devices at the time of signal acquisition may be approximated using any one of several techniques including, for example, positioning techniques performed at the mobile devices. Here, a mobile device may obtain a position fix from acquisition of GNSS signals or any of the indoor positioning techniques described above (e.g., associating RSSI values of acquired signals with expected signature values in a radio heatmap, tracked location following last position fix using inertial sensor measurements, just to provide a few examples). Alternatively, the approximate location may be entered manually by a user at the mobile device. It should be understood, however, that these are merely examples of how an approximate location of a mobile device may be determined and claimed subject matter is not limited in this respect.

As pointed out above, a radio heatmap may define expected RTT signature values for individual grid point locations. Also as pointed out above, actual RTT measurements at a grid point location may be affected or distorted in particular environments (e.g., in the presence of multipath). For any particular grid point location defined in a radio heatmap, block 256 may attempt to determine or update an expected RTT signature values based, at least in part, on RTT measurements obtained at block 252 and the approximate locations of a receiver device obtaining the RTT measurements. As described below in a particular implementation, block 256 may interpolate or extrapolate RTT measurements obtained by mobile devices at the mobile device locations, to the grid point locations represented in the radio heatmap.

Figure 4B:
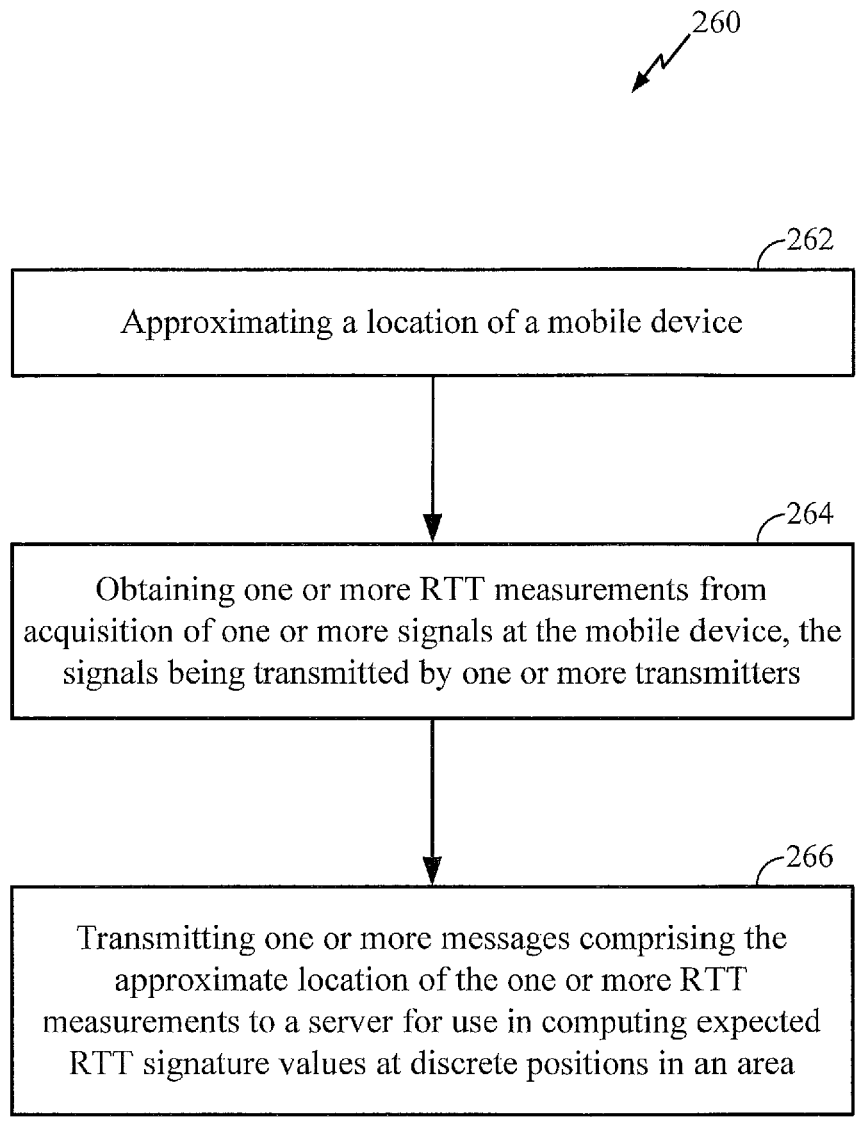
FIG. 4B is a flow diagram of a process to provide round trip time measurements in combination with locations of receivers according to an embodiment.

FIG. 4B is a flow diagram of a process 260 to provide RTT/ground truth pairs collected at a mobile device to a server for use in computing expected RTT signature values. Block 262 may approximate a location of the mobile device using one or more of techniques for obtaining ground truth measurements. At block 264, the mobile device may obtain one or more RTT measurements from acquisition one or more signals transmitted by one or more transmitters. At block 266, the mobile device may transmit one or more messages to a server containing the approximate location obtained at block 262 and the one or more RTT measurements obtained at block 264 for use in computing expected RTT signature values at discrete positions in an area.

Figure 5A:
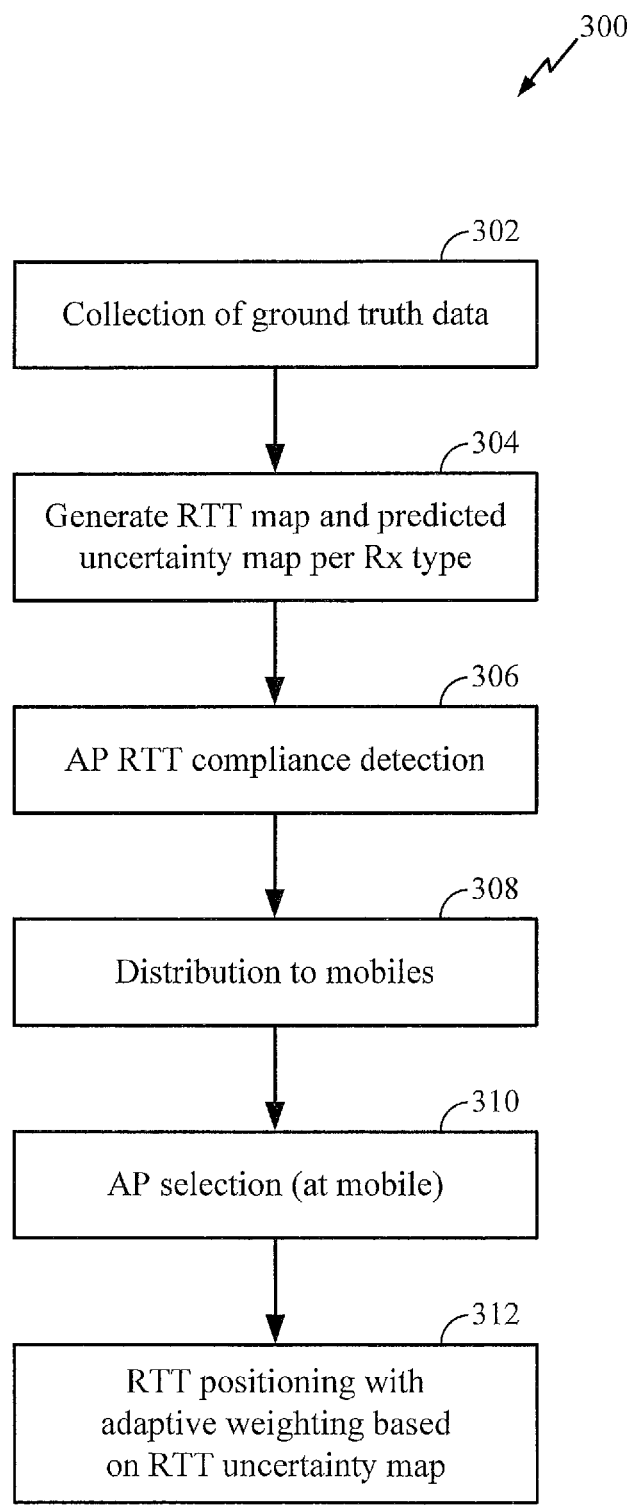
FIG. 5A is a flow diagram of a process to determine location-based signature values according to an alternative embodiment.

FIG. 5A is a flow diagram of a process 300 to determine location-based signature values according to an alternative embodiment. Aspects of process 300 need not be performed, in whole or in part, by any particular single device. Furthermore, the sequence of operations illustrated in FIG. 5A is merely an example sequence and these operations may be performed in the same or different order as illustrated in FIG. 5A. Block 302 may collect ground truth measurements obtained at mobile devices in an area. In one example implementation, the collected ground truth measurements may comprise crowd sourced measurements obtained from multiple mobile devices which are transmitted to a central server. A crowd sourced measurement may be provided in a message from a mobile device to the server setting forth an RTT measurement value based on a signal acquired from a transmitter, an identification of the transmitter (e.g., MAC ID) and location of the mobile device while the RTT measurement value is obtained. Alternatively, the message may also include a measured or approximate range from the mobile device to the transmitter and/or RSSI measurement.

Figure 5B:
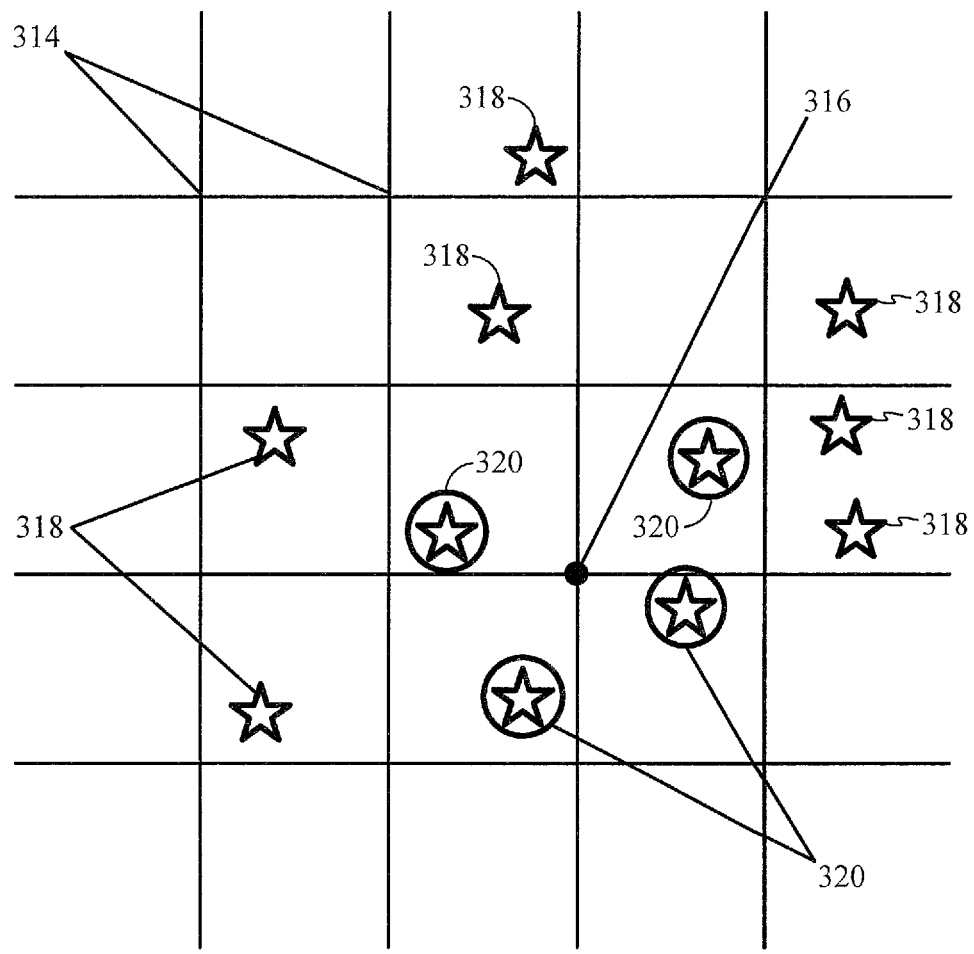
FIGS. 5B and 5C are diagrams illustrating measurements obtained in proximity to a grid point defined in a radio heatmap according to an embodiment.

FIG. 5B is a diagram showing locations 314 defined in a radio heatmap to be associated with expected signatures. While FIG. 5B shows that locations 314 are provided as grid points in a rectangular grid, it should be understood that a radio heatmap may define such locations in a different or even random pattern without deviating from claimed subject matter. In the particular illustrated example, RTT measurements are taken contemporaneously with ground truth measurements 318 and 320 to provide RTT/ground truth pairs. A mobile device may obtain ground truth measurements using any one of several techniques such as, for example, obtaining a position fix from acquisition of a signal, tracing a path from a last known location using inertial sensor measurements, just to name a couple of examples. Here, RTT/ground truth pairs from ground truth measurements 320 closest to location 316 defined in the radio heatmap are used for computing or updating an expected RTT signature value for location 316. RTT/ground truth pairs from the more distant ground truth measurements 318 may be excluded from such a determination. Here, in a particular approach to selecting RTT/ground truth pairs, an N=4 number of RTT/ground truth pairs closest to location 316 may be selected for computing or updating the expected RTT signature value for location 316 while more distant RTT/ground truth pairs may be excluded.

In a particular implementation, a weighted average of RTT ground-truth measurements at N nearest neighbor locations 320 may be computed according to expression (1) for use as an expected RTT signature value $RTT_{sig}$ as follows:

$$RTT_{sig} = \frac{1}{N}\sum_{i=1}^{N} w_i \times RTT_{meas,i} \qquad (1)$$

where:
 $w_i$ is a weight parameter that may depend on a distance of the i-th ground-truth RTT measurement (represented by $RTT_{meas,i}$);
 N is a tuning parameter (whose value may be specific to a particular venue, for example).

Figure 5C:
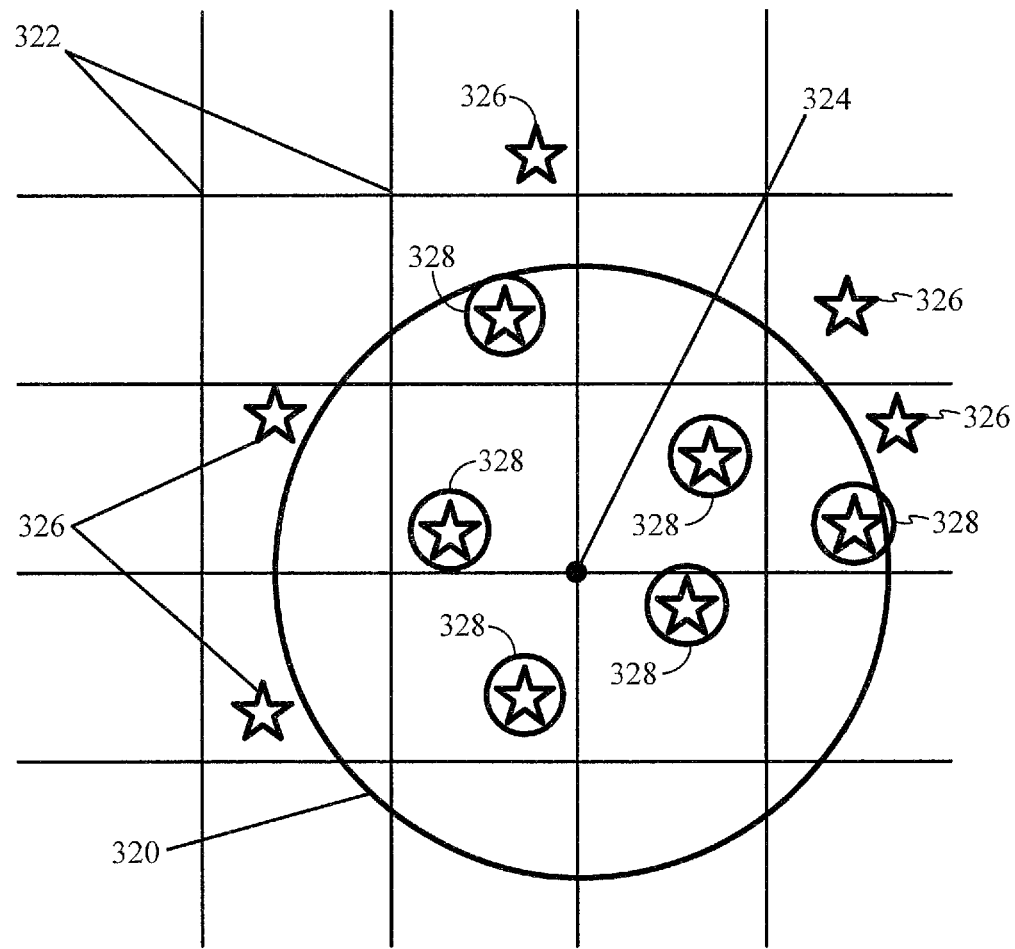

In an alternative implementation of FIG. 5C, instead of applying a tuning parameter N in expression (1), RTT/ground truth pairs within a distance or radius of a location 314 defined in a radio heatmap may be used for computing an expected RTT signature while other RTT/ground truth pairs are excluded. Here, RTT/ground truth pairs from ground truth measurements 328 within circle 320 centered about location 324 among locations 322 defined by the radio heatmap are used for computing or updating an expected RTT signature value for location 324. In this implementation, a radius of circle 320 may be a substitute for tuning parameter N. RTT/ground truth pairs from ground truth measurements 326 outside of circle 320 may be excluded from use in computing or updating an expected RTT signature value for location 324. In either case, the uncertainty metrics σ may be estimated according to expression (2) as follows:

$$\sigma^2 = \frac{1}{N-1}\sum_{i=1}^{N} w_i \times (RTT_{meas,i} - RTT_{sig})^2 \qquad (2)$$

As pointed out above, in a particular implementation a Gaussian process regression may interpolate and/or extrapolate RTT measurements between or among discrete positions identified in a radio heatmap for determining expected RTT signatures at the discrete positions. For example, RTT measurements paired with ground truth measurements may be expressed in a vector form as follows:

$$y = \begin{bmatrix} RTT_{meas,1} \\ RTT_{meas,2} \\ \vdots \\ RTT_{meas,N} \end{bmatrix}$$

$$x = \begin{bmatrix} x_1 \\ x_2 \\ \vdots \\ x_N \end{bmatrix}$$

where $x_i$ for i=1, ..., N is the ground truth location contemporaneous with the i-th RTT measurement.

An expected RTT signature value $RTT_{sig}$ at a location $x_{sig}$ defined in a radio heatmap may be expressed according to expression (3) as follows:

$$RTT_{sig} = a^T(M+\sigma_n I_N)^{-}y \qquad (3)$$

Where:
 $\sigma_n$ is a metric quantifying measurement noise;
 $I_N$ is an identity matrix of dimension N;
 M is a matrix defined as:

$$M = \begin{bmatrix} k(x_1,x_1) & k(x_1,x_2) & \cdots & k(x_1,x_N) \\ k(x_2,x_1) & k(x_2,x_2) & & \\ \vdots & & \ddots & \\ k(x_N,x_1) & & & k(x_N,x_N) \end{bmatrix};$$

and
 a is a vector defined as:

$$a = \begin{bmatrix} k(x_1,x_{sig}) \\ k(x_2,x_{sig}) \\ \vdots \\ k(x_N,x_{sig}) \end{bmatrix}.$$

Here, $k(x_i,x_j)$ may represent a kernel function to compute a scalar real value representing an assumed correlation between measurements at locations $x_i$ and $x_j$. One particular example for such a kernel function is provided in expression (4) as follows:

$$k(x_i, x_j) = \exp\left(-\frac{(x_i - x_j)^T(x_i - x_j)}{2l^2}\right) \quad (4)$$

where l is a tuning parameter.

Figure 6:
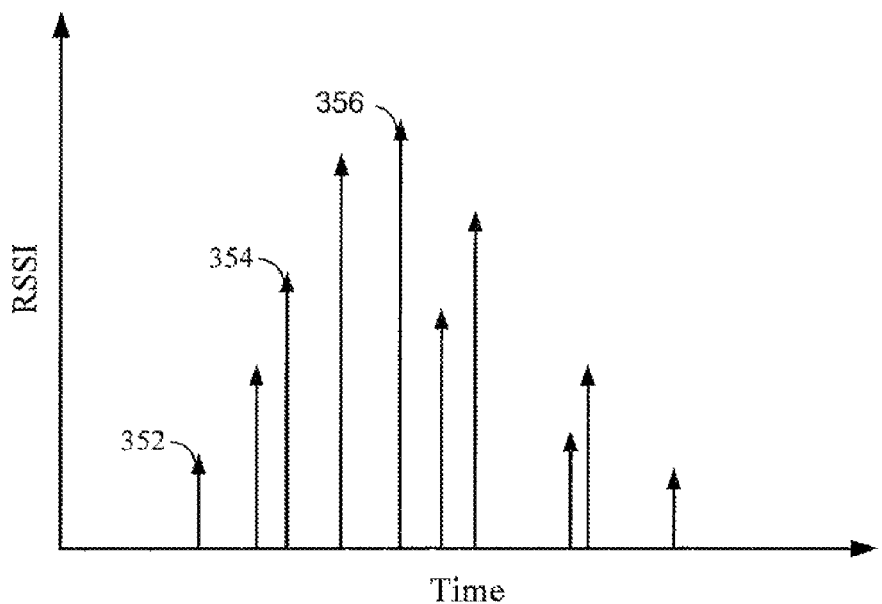
FIG. 6 is a plot of a profile of components of a signal acquired at a receiver at different times according to an embodiment.

In particular implementations, a receiver may acquire any one of multiple different temporal components of a return signal for computing RTT including, for example, a line of sight component and one or more multipath components. As shown in the plot of FIG. 6, as an example, components of a return signal for computing RTT may arrive at a receiver at different times and signal strengths. Here, signal component 356 has the highest signal strength, signal component 352 arrives the earliest and signal component 354 is the earliest arriving signal having a signal strength at least 50% of that of the strongest signal component 356. In an example, a software driver on a mobile device processing observations from a receiver may acquire and/or select any one of these three signal components for computing an RTT measurement. Accordingly, depending on a particular mobile device design, any of these three different components may be selected for computing an RTT measurement to provide correspondingly different results.

Figure 7:
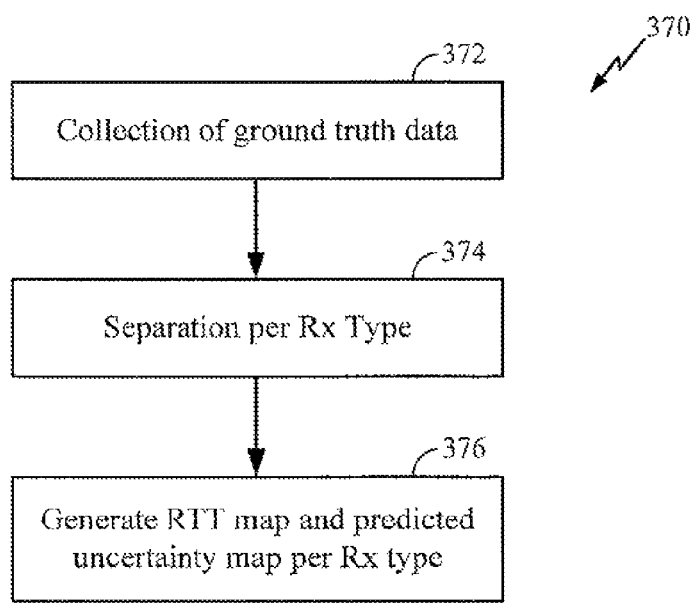
FIG. 7 is a flow diagram of a process to determine location-based signature values dependent, at least in part, on types of receivers according to an embodiment.

According to an embodiment, block 304 may generate different heatmap values for different receiver types (e.g., to address particular methodologies for selecting among multiple signal components as discussed above with reference to FIG. 6). In one implementation, for example, an expected RTT signature values computed for a first receiver type may be used to derive expected RTT signature values for a second receiver type by applying an offset. In another implementation, block 304 may compute expected RTT signature values for a particular receiver type by combining RTT measurements obtained exclusively by mobile devices having the particular receiver type. Expected RTT signature values for another, different, receiver type may be computed by combining RTT measurements obtained by mobile devices having the particular receiver type. This is illustrated by example in process 370 shown in FIG. 7 in which ground truth data collected at block 372 may be sorted by receiver type at block 374. Different expected RTT signature values may then be computed for different types of receivers of a mobile device at block 376. It should be understood, however, that these are merely examples of how expected RTT signature values may be computed for different receiver types, and claimed subject matter is not limited in this respect.

A measured RTT may comprise twice the time for a wireless signal to travel a range separating a mobile device and a transceiver plus a processing latency at the transceiver in providing a response to a probe signal from the mobile device. In particular implementations it is recognized that this processing latency may be more stable or predictable in some transceivers than in others. Block 306 may select from among available transceivers to eliminate transceivers having unacceptably unstable or unpredictable processing latencies. RTT measurements from the remaining transceivers may then consistently include roughly the same processing latency. In particular implementations, selection from among available transceivers may be made at a server based, at least in part, on crowd sourced measurements and provided to a mobile device as positioning assistance data.

Block 308 may distribute a radio heatmap from a server to mobile devices as navigation assistance data in response to a request message from the mobile device as discussed above. According to an embodiment, expected RTT signature values in such a radio heatmap distributed to mobile devices as navigation assistance data may be limited to RTT signature values obtained from transceivers having a predictable and/or stable latency in responding to a probe signal as discussed above. For example, any expected RTT signature values computed for transceivers having an unstable or unpredictable response latency may be excluded from the radio heatmap.

According to an embodiment, a mobile device in an area may be capable of communicating with multiple transceivers in its vicinity to, for example, receive a wireless communication service. However, a mobile device in a particular vicinity may not be capable of communicating with all transceivers serving a particular area (e.g., out of range or presence of physical obstructions prohibits a strong line of sight signal). While block 306 may eliminate transceivers having unacceptably unstable or unpredictable processing latencies, at block 310 a mobile device may select from among available transceivers that are "viewable" by the mobile device give the mobile device's ground truth location.

At block 312, a mobile device may attempt to correlate RTT measurements obtained from transceivers selected in block 310 with expected RTT signature values to obtain a position fix as discussed above. As pointed out above, a radio heatmap may associate expected RTT signature values for predefined locations with an uncertainty metric (e.g., $\sigma^2$ as computed in expression (2)) which are included in a radio heatmap provided as assistance data in an uncertainty map. In computing a position fix, a mobile device may the attribute greater weight to expected RTT signature values for transceivers associated with a lower uncertainty value in comparison weights applied to expected RTT signature values for transceivers associated with a higher uncertainty value. If a mobile device is employing a motion model such as a particle filter, for example, the motion model may more heavily weight RTT measurements obtained from transceivers associated with a lower uncertainty.

Figure 8:
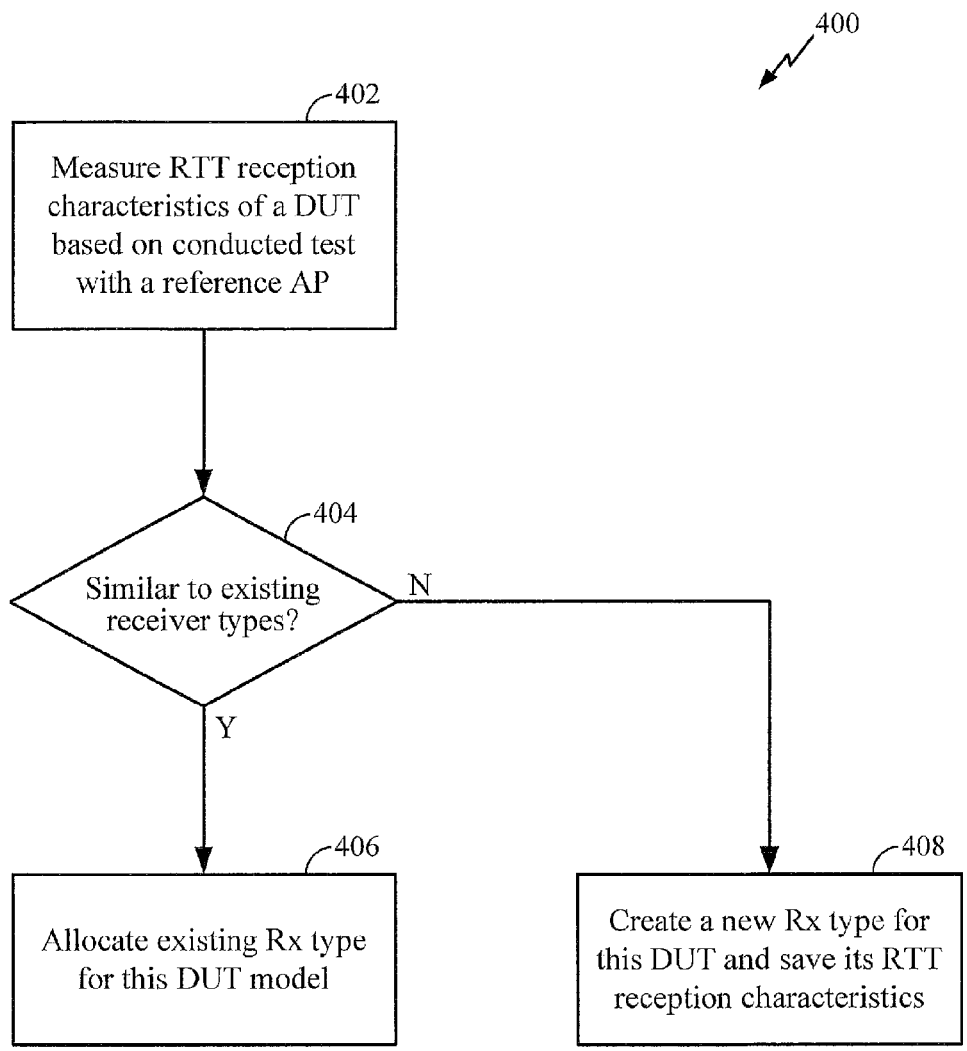
FIG. 8 is a flow diagram of a process to categorize a receiver according to an embodiment.

As pointed out above at block 304, an expected RTT signature value for a particular transceiver at a grid point may be determined differently for different receiver types (e.g., selecting a component response signal as having the strongest signal, first received or first component received which has a signal strength that is at least 50% that of the strongest received component as described above in connection with FIG. 6). FIG. 8 is a flow diagram of a process 400 to categorize a mobile device as a "device under test (DUT)." At block 402, a RTT measurement characteristics may be obtained for a particular reference transceiver at a location. The obtained RTT measurement characteristics may be compared with RTT measurement characteristics for previously identified receiver types at diamond 404. These RTT measurement characteristics may include, for example, an average measured RTT and expected variance. If the RTT measurement characteristics match those of one of the previously defined receiver types, block 406 may classify the DUT as having a receiver type of the previously identified receiver type. If the RTT measurement characteristics do not match those of one of the previously defined receiver types, block 408 may identify a new receiver type classification for the DUT having RTT characteristics as determined at block 402.

Figure 9:
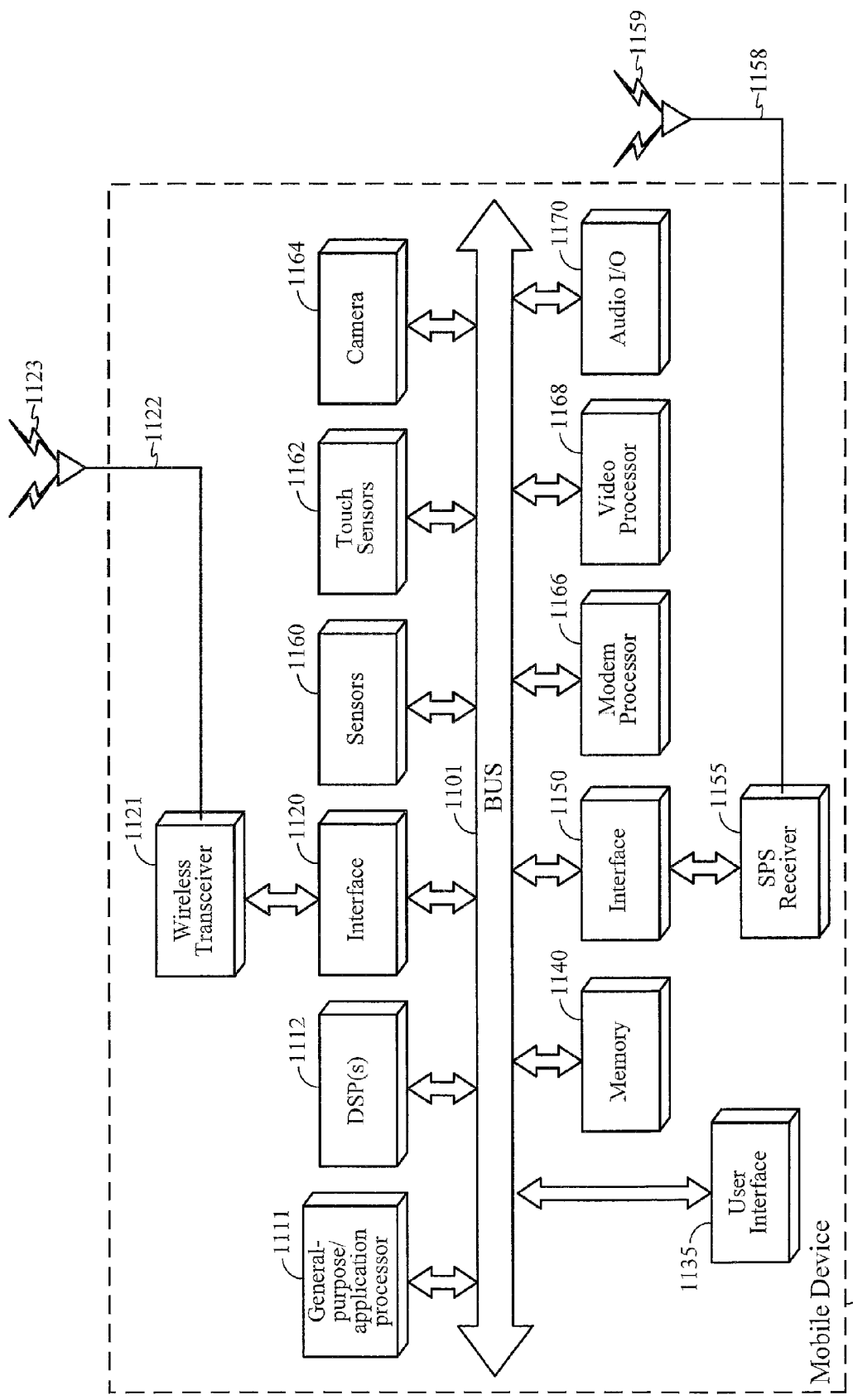
FIG. 9 is a schematic block diagram illustrating an exemplary mobile device, in accordance with an implementation.

FIG. 9 is a schematic diagram of a mobile device according to an embodiment. Mobile device 100 (FIG. 1) may comprise one or more features of mobile device 1100 shown in FIG. 2. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 9, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 9, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose application processor 1111 in support of one or more applications such as, for example, applications directed to positioning or navigation operations.

In a particular implementation, a digital map of an indoor area may be stored in a particular format in memory 1140. The digital map may have been obtained from messages containing navigation assistance data from a remote server. General purpose/application processor 1111 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area. In one implementation, a mobile device may further apply crowed sourced data (e.g., obtained from a location server) to confirm an inferences of an egress segment. For example, if there is a history of mobile devices moving through a feature presumed to be an egress segment, the feature may be confirmed as providing an egress segment.

In a particular implementation, mobile device 1100 may comprise a dedicated modem processor 1166 capable of performing baseband processing of signals received and down-converted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 10:
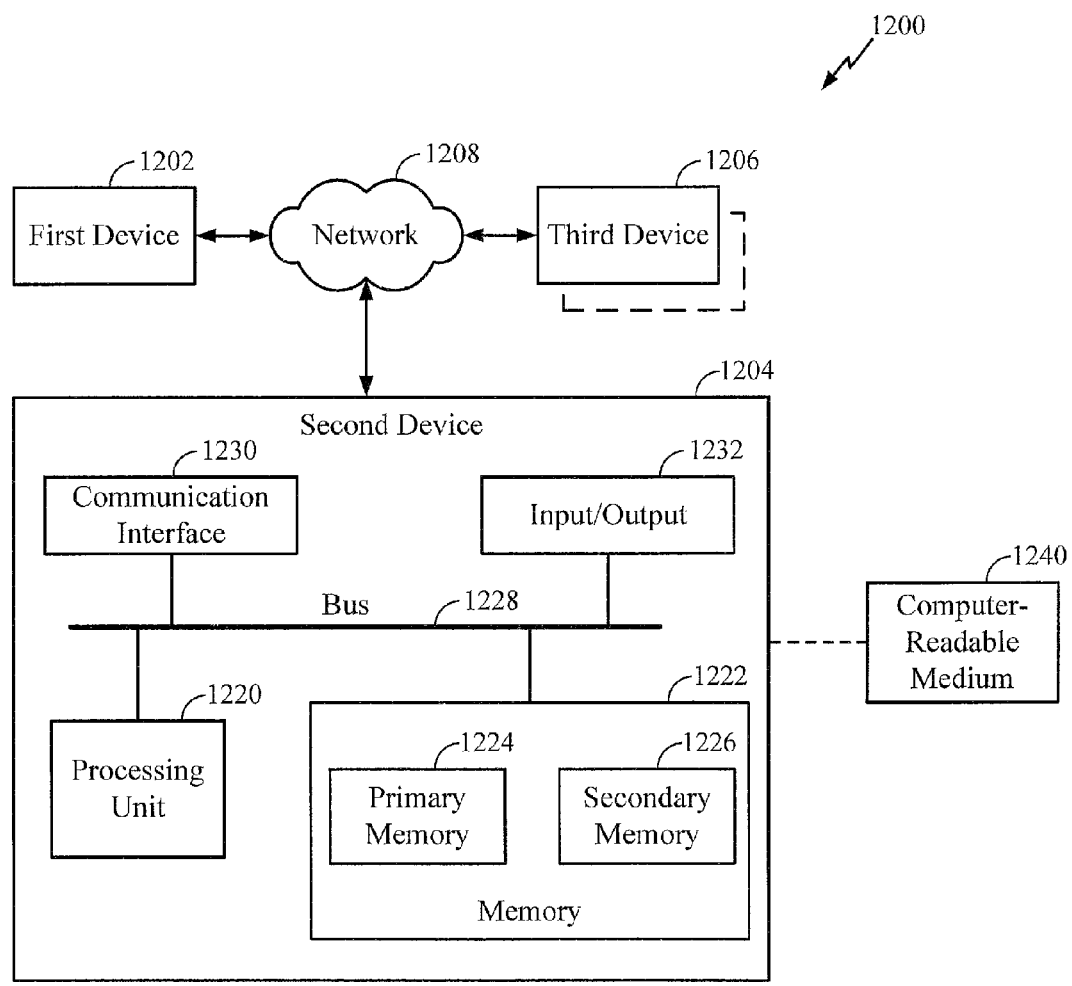
FIG. 10 is a schematic block diagram of an example computing platform.

FIG. 10 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. First device 1202 may also comprise a server capable of providing an LCI to a requesting mobile device based, at least in part, on a rough estimate of a location of the requesting mobile device. First device 1202 may also comprise a server capable of providing indoor positioning assistance data relevant to a location of an LCI specified in a request from a mobile device. Second and third devices 1204 and 1206 may comprise mobile devices, in an aspect. Also, in an aspect, wireless communications network 1208 may comprise one or more wireless access points, for example. However, claimed subject matter is not limited in scope in these respects.

First device 1202, second device 1204 and third device 1206, as shown in FIG. 10, may be representative of any device, appliance or machine (e.g., such as local transceiver 115 or servers 140, 150 or 155 as shown in FIG. 1) that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, wireless communications network 1208 (e.g., in a particular of implementation of network 130 shown in FIG. 1), may be representative of one or more communication links, processes, or resources configurable to support the exchange of data between at least two of first device 1202, second device 1204, and third device 1206. By way of example but not limitation, wireless communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In a particular implementation, a digital map of an indoor area may be stored in a particular format in memory 1222. Processing unit 1220 may execute instructions to processes the stored digital map to identify and classify component areas bounded by a perimeter of structures indicated in the digital map. As pointed out above, these executed instructions may specify identifying and characterizing egress segments in structures forming a perimeter bounding a component area and classifying the bounded component area based, at least in part, on a proportionality of a size of at least one identified egress segment to a size of at least one dimension of the bounded component area.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising:
obtaining a first plurality of round trip time (RTT) measurements from acquisition of signals by a plurality of mobile devices, said signals being transmitted by one or more transmitters;
identifying a selected type of receiver used to acquire at least one of said signals by at least one mobile device of said plurality of mobile devices, said selected type of receiver being selected from among multiple types of receivers;
approximating locations of at least a portion of said plurality of mobile devices, wherein said approximated locations are of said at least said portion of said plurality of mobile devices during a time that said at least said portion of said plurality of mobile devices are obtaining at least a first portion of said first plurality of RTT measurements, and wherein said approximated locations are derived based upon other than said at least said first portion of said first plurality of RTT measurements;
selecting a second plurality of RTT measurements comprising at least a portion of said at least said first portion of said first plurality of RTT measurements, wherein said second plurality of RTT measurements corresponds to said selected type of receiver; and
combining said selected second plurality of RTT measurements to determine expected RTT signature values at discrete positions in an area based, at least in part, on said selected second plurality of RTT measurements and said approximated locations,
wherein said expected RTT signature values are for application by said at least one of said plurality of mobile devices employing said selected type of receiver.

2. The method of claim 1, and further comprising providing said expected RTT signature values to at least one other mobile device for use in positioning operations.

3. The method of claim 2, and further comprising:
computing expected uncertainty values associated with said expected RTT signature values; and
combining said expected uncertainty values with said expected RTT signature values as positioning assistance data.

4. The method of claim 1, wherein said combining said selected second plurality of RTT measurements to determine said expected RTT signature values comprises interpolating or extrapolating said expected RTT signature values between said approximated locations and said discrete positions.

5. The method of claim 4, wherein interpolating or extrapolating said expected RTT signature values between said approximated locations and said discrete positions comprises applying a Gaussian process regression.

6. The method of claim 4, wherein said discrete positions comprise locations defined on grid points defined by a radio heatmap over an indoor area.

7. The method of claim 1, and further comprising constructing multiple radio heatmaps corresponding to said multiple types of receivers based, at least in part, on said expected RTT signature values for the application.

8. The method of claim 1, wherein said multiple types of receivers are based, at least in part, on properties of said multiple types of receivers to select a component from among multiple components for computation of an RTT measurement.

9. The method of claim 8, wherein the multiple components comprise at least one line of sight component and at least one multipath component.

10. The method of claim 1, wherein said approximated locations are based, at least in part, on ground truth measurements obtained from said at least said portion of said plurality of mobile devices.

11. The method of claim 1 further comprising sorting said first plurality of RTT measurements, at least in part, by said multiple types of receivers.

12. An apparatus comprising:
a communication interface; and
one or more processors to:
access a first plurality of round trip time (RTT) measurements received at said communication interface, wherein said first plurality of RTT measurements are obtained from acquisition of signals by a plurality of mobile devices, said signals being transmitted by one or more transmitters;
identify a selected type of receiver used to acquire at least one of said signals by at least one mobile device of said plurality of mobile devices, said selected type of receiver being selected from among multiple types of receivers;
approximate locations of at least a portion of said plurality of mobile devices, wherein said approximated locations are of said at least said portion of said plurality of mobile devices during a time that said at least said portion of said plurality of mobile devices are obtaining at least a first portion of said first plurality of RTT measurements, and wherein said approximated locations are derived based upon other than said at least said first portion of said first plurality of RTT measurements;
select a second plurality of RTT measurements comprising at least a portion of said at least said first portion of said first plurality of RTT measurements, wherein said second plurality of RTT measurements corresponds to said selected type of receiver; and
combine said selected second plurality of RTT measurements to determine expected RTT signature values at discrete positions in an area based, at least in part, on said selected second plurality of RTT measurements and said approximated locations,
wherein said expected RTT signature values are for application by said at least one of said plurality of mobile devices employing said selected type of receiver.

13. The apparatus of claim 12, wherein said one or more processors are further to provide said expected RTT signature values to at least one other mobile device for use in positioning operations.

14. The apparatus of claim 12, wherein said one or more processors are further to combine said selected second plurality of RTT measurements to determine said expected RTT signature values by interpolating or extrapolating said expected RTT signature values between said approximate locations and said discrete positions.

15. The apparatus of claim 14, wherein interpolating or extrapolating said expected RTT signature values between said approximate locations and said discrete positions comprises applying a Gaussian process regression.

16. The apparatus of claim 14, wherein said discrete positions comprise locations defined on grid points defined by a radio heatmap over an indoor area.

17. The apparatus of claim 12 wherein said one or more processors are further to sort said first plurality of RTT measurements, at least in part, by said multiple types of receivers.

18. A non-transitory storage medium comprising machine-readable code, stored thereon, which is executable by a special purpose computing apparatus, comprising:
code to obtain a first plurality of round trip time (RTT) measurements from acquisition of signals by a plurality of mobile devices, said signals being transmitted by one or more transmitters;
code to identify a selected type of receiver used to acquire at least one of said signals by at least one mobile device of said plurality of mobile devices, said selected type of receiver being selected from among multiple types of receivers;
code to approximate locations of at least a portion of said plurality of mobile devices, wherein said approximated locations are of said at least said portion of said plurality of mobile devices during a time that said at least said portion of said plurality of mobile devices are obtaining at least a first portion of said first plurality of RTT measurements, and wherein said approximated locations are derived based upon other than said at least said first portion of said first plurality of RTT measurements;
code to select a second plurality of RTT measurements comprising at least a portion of said at least said first portion of said first plurality of RTT measurements, wherein said second plurality of RTT measurements corresponds to said selected type of receiver; and
code to combine said selected second plurality of RTT measurements to determine expected RTT signature values at discrete positions in an area based, at least in part, on said selected second plurality of RTT measurements and said approximated locations,
wherein said expected RTT signature values are for application by said at least one of said plurality of mobile devices employing said selected type of receiver.

19. The storage medium of claim 18, further comprising code to provide said expected RTT signature values to at least one other mobile device for use in positioning operations.

20. The storage medium of claim 18, wherein said code to combine said selected second plurality of RTT measurements further comprises code to combine said selected second plurality of RTT measurements to determine expected RTT signature values by interpolating or extrapolating said expected RTT signature values between said approximate locations and said discrete positions.

21. The storage medium of claim 20, wherein said code to combine said selected second plurality of RTT measurements to determine expected RTT signature values by interpolating or extrapolating said expected RTT signature values between said approximate locations and said discrete positions comprises code to apply a Gaussian process regression.

22. The storage medium of claim 20, wherein said discrete positions comprise locations defined on grid points defined by a radio heatmap over an indoor area.

23. The storage medium of claim 18 further comprising code to sort said first plurality of RTT measurements, at least in part, by said multiple types of receivers.

24. An apparatus comprising:
means for obtaining a first plurality of round trip time (RTT) measurements from acquisition of signals by a plurality of mobile devices, said signals being transmitted by one or more transmitters;
means for identifying a selected type of receiver used to acquire at least one of said signals by at least one mobile device of said plurality of mobile devices, said selected type of receiver being selected from among multiple types of receivers;
means for approximating locations of at least a portion of said plurality of mobile devices, wherein said approximated locations are of said at least said portion of said plurality of mobile devices during a time that said at least said portion of said plurality of mobile devices are obtaining at least a first portion of said first plurality of RTT measurements, and wherein said approximated locations are derived based upon other than said at least said first portion of said first plurality of RTT measurements;
means for selecting a second plurality of RTT measurements comprising at least a portion of said at least said first portion of said first plurality of RTT measurements, wherein said second plurality of RTT measurements corresponds to said selected type of receiver; and
means for combining said selected second plurality of RTT measurements to determine expected RTT signature values at discrete positions in an area based, at least in part, on said selected second plurality of RTT measurements and the approximated locations,
wherein said expected RTT signature values are for application by said at least one of said plurality of mobile devices employing said selected type of receiver.

25. A method comprising, at a mobile device:
approximating a location of said mobile device;
obtaining one or more round trip time (RTT) measurements from acquisition of one or more signals at said mobile device, said one or more signals being transmitted by one or more transmitters; and
transmitting one or more messages comprising said approximated location and said one or more RTT measurements to a server for use in computing expected RTT signature values at discrete positions in an area,
wherein the one or more messages further identify a type of receiver used by said mobile device to acquire said one or more signals.

26. The method of claim 25, and further comprising receiving one or more messages comprising said computed expected RTT signature values for use in positioning operations at said mobile device.

27. A mobile device comprising:
a transceiver to transmit and receive signals over a wireless communication link; and
one or more processors configured to:
obtain one or more round trip time (RTT) measurements from acquisition of one or more signals at said transceiver, said signals being transmitted by one or more transmitters; and
initiate transmission of one or more messages through said transceiver comprising an approximate location of said mobile device and said one or more RTT measurements to a server for use in computing expected RTT signature values at discrete positions in an area,
wherein the one or more messages further identify a type of the transceiver used by said mobile device to acquire said one or more signals.

28. The mobile device of claim 27, and further comprising one or more inertial sensors, and wherein said one or more processors are further configured to determine said approximate location of said mobile device based, at least in part, on one or more measurements obtained from said one or more inertial sensors.

29. The mobile device of claim 27, wherein the or more processors are further configured to obtain one or more messages received at said transceiver comprising said computed expected RTT signature values for use in positioning operations at said mobile device.

30. A mobile device comprising:

means for approximating a location of said mobile device;

means for obtaining one or more round trip time (RTT) measurements from acquisition of one or more signals at said mobile device, said one or more signals being transmitted by one or more transmitters; and means for transmitting one or more messages comprising said approximated location and said one or more RTT measurements to a server for use in computing expected RTT signature values at discrete positions in an area, wherein the one or more messages further identify a type of receiver used by said mobile device to acquire said one or more signals.

31. An article comprising:

a storage medium comprising machine-readable instructions stored thereon which are executable by a special purpose computing apparatus in a mobile device to:

approximate a location of said mobile device;

obtain one or more round trip time (RTT) measurements from acquisition of one or more signals at said mobile device, said one or more signals being transmitted by one or more transmitters; and transmit one or more messages comprising said approximated location and said one or more RTT measurements to a server for use in computing expected RTT signature values at discrete positions in an area, wherein the one or more messages further identify a type of receiver used by said mobile device to acquire said one or more signals.

\* \* \* \* \*